US008534234B2

(12) United States Patent
Moore, III

(10) Patent No.: US 8,534,234 B2
(45) Date of Patent: Sep. 17, 2013

(54) REVERSIBLE PET SPIRAL STAIRCASE

(76) Inventor: William Arthur Moore, III, Henderson, TX (US)

( * ) Notice: Subject to any disclaimer, the term of this patent is extended or adjusted under 35 U.S.C. 154(b) by 306 days.

(21) Appl. No.: 13/034,987

(22) Filed: Feb. 25, 2011

(65) Prior Publication Data

US 2011/0209672 A1     Sep. 1, 2011

Related U.S. Application Data

(60) Provisional application No. 61/308,356, filed on Feb. 26, 2010.

(51) Int. Cl.
  *B65G 69/28* (2006.01)
  *E04F 11/00* (2006.01)
(52) U.S. Cl.
  USPC ............................................ 119/847; 52/187
(58) Field of Classification Search
  USPC ......... 52/182–191; 108/92–101; 182/34–35, 182/151; 119/849, 847
  See application file for complete search history.

(56) References Cited

U.S. PATENT DOCUMENTS

| 52,922 A * | 2/1866 | Widmayer ...................... 52/187 |
| 432,599 A * | 7/1890 | Clarke ............................ 52/187 |
| 750,998 A * | 2/1904 | Ohnstrand ...................... 52/187 |
| 1,774,582 A | 9/1930 | Woodbridge |
| 3,482,364 A * | 12/1969 | Albrektson et al. ............ 52/187 |
| 3,513,547 A | 5/1970 | Suckno |
| 3,686,806 A * | 8/1972 | Verderio ......................... 52/187 |
| 3,713,260 A * | 1/1973 | Brauckmann ................... 52/187 |
| 3,740,906 A * | 6/1973 | Schneider ....................... 52/187 |
| 3,902,948 A * | 9/1975 | Morros ........................... 156/222 |
| 3,964,222 A * | 6/1976 | Geleijnse et al. ............... 52/187 |
| 4,338,751 A * | 7/1982 | Sanders .......................... 52/187 |
| 4,378,862 A * | 4/1983 | Carmel ........................... 182/106 |
| 4,413,460 A * | 11/1983 | Gerlach ........................ 52/741.2 |
| 4,938,364 A * | 7/1990 | Stadelman et al. ............. 211/47 |
| 5,088,248 A * | 2/1992 | Manna ............................ 52/187 |
| 5,309,687 A | 5/1994 | Walston |
| 5,347,774 A | 9/1994 | Smith |
| 5,515,657 A | 5/1996 | Chou |
| 5,535,557 A * | 7/1996 | Garber ............................ 52/187 |
| 5,829,390 A * | 11/1998 | Jonilla et al. ................... 119/706 |
| 6,108,988 A * | 8/2000 | Nagelski et al. ................ 52/187 |
| 6,490,997 B1 * | 12/2002 | Biermann et al. ............ 119/706 |
| 6,523,310 B1 | 2/2003 | Tseng |
| 6,543,191 B1 * | 4/2003 | Kress ............................. 52/182 |
| 7,377,080 B2 | 5/2008 | Mills |
| 2004/0079297 A1 | 4/2004 | Wolfington et al. |
| 2004/0244724 A1 | 12/2004 | Runge |
| 2007/0089690 A1 | 4/2007 | Khubani et al. |
| 2007/0144084 A1 * | 6/2007 | Barry et al. ..................... 52/187 |

(Continued)

*Primary Examiner* — Kimberly Berona
*Assistant Examiner* — Joshua Huson
(74) *Attorney, Agent, or Firm* — Eric C. Schmalbach

(57) ABSTRACT

The invention relates to apparatuses for a reversible pet spiral staircase. Embodiments of the invention comprise: a bottom tread storage platform member; a plurality of tread platform members, elevated above the bottom storage platform member; a center leg support member, and a plurality of outer leg support members, which support the tread platform members; and a helical skirt board railing member that supports the tread platform members and traverses the perimeter of the apparatus. Embodiments of the invention are capable of being configured in either the left-hand spiral configuration, or the right-hand spiral configuration. Embodiments of the invention allow the apparatus to be self-supporting; reversible; space-saving; compactable for storage; safe for pet elevation; easily assembled; reconfigurable; and environmentally safe.

25 Claims, 12 Drawing Sheets

Left Hand Spiral

Right Hand Spiral

(56) References Cited

U.S. PATENT DOCUMENTS

| | | |
|---|---|---|
| 2007/0289556 A1 | 12/2007 | Hoffman et al. |
| 2008/0236066 A1 * | 10/2008 | Arnold .......................... 52/187 |
| 2008/0302312 A1 | 12/2008 | Steffey et al. |

* cited by examiner

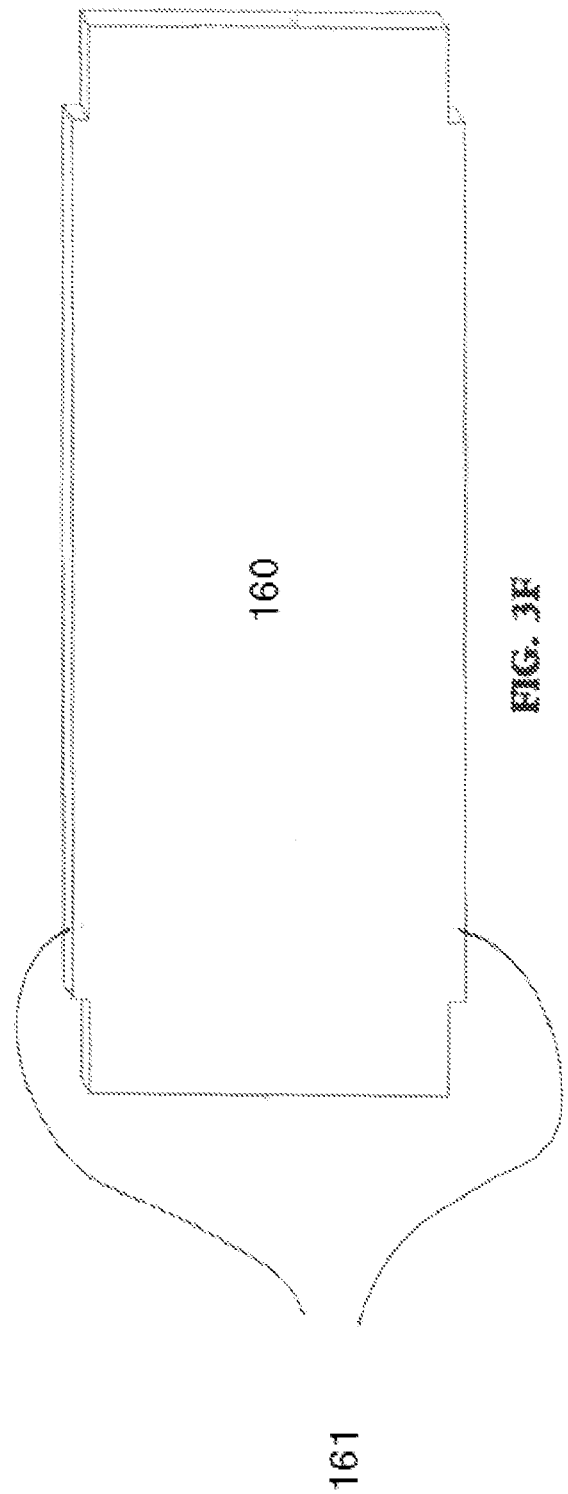

REVERSIBLE PET SPIRAL STAIRCASE

CROSS-REFERENCE AND PRIORITY CLAIMS

The present application claims the benefit of Provisional U.S. Application No. 61/308,356, dated Feb. 26, 2010 entitled "Reversible Pet Spiral Staircase," the disclosure of which is incorporated by reference.

BACKGROUND

The present invention is relates to pet staircases. More specifically, the invention relates to a reversible pet spiral staircase, specifically adaptable to allow household pets to traverse vertical elevations. Embodiments of the invention allow the apparatus to be self-supporting; reversible; space-saving; compactable for storage; safe for pet elevation; easily assembled; reconfigurable; and environmentally safe.

Pet owners often consider their pets as family members. It may be desirable for pets to elevate onto household furniture or even onto a bed. The trend in the bedding industry involves raising the altitude of its products, to satisfy customer preferences for thicker mattresses. As mattresses get thicker, the vertical distance between the floor and the top of the mattress increases. Pets struggle to reach these increased heights. Conventional straight pet steps or pet ramps have attempted to solve the problem of increased elevation. See for example: U.S. Pat. No. 7,621,236; and U.S. Patent Publication Nos. 2004/0079297, 2004/0244724, 2007/0089690, 2007/0289556, and 2008/0302312. However, these references suffer from a number of disadvantages, including: the requirement of a large amount of floor space to traverse the vertical distance; the lack of an ability to reconfigure the vertical distance; the lack of removable inserts; the lack of the ability to be vertically reconfigured; and the lack of special adaptability.

Staircases traversing around a central or fixed point, often allow some space to be saved in escalating the stairway. Several types of such staircase exist, such as winding staircases and spiral staircases. Winding staircase revolve in a helical fashion around a central point. However, the interior edge of each step is offset a distance from the central radius. Attempts have been made to provide winding staircases for traversing vertical elevations. See, for example, U.S. Pat. Nos. 5,347,774, and 5,309,687. However, these designs suffer from a number of disadvantages, including: the lack of ability to be self-supporting; the requirement of a large amount of floor space to traverse the vertical distance; the lack of an ability to reconfigure the vertical distance; the lack of removable inserts; the lack of special adaptability; permanent attachment to a fixed structure; and the lack of ability of ease of assembly and storage. Spiral staircases also revolve in a helical fashion around a central point. The interior edge of each step is not offset from the central point. Therefore, spiral staircases can be more space efficient, and could prevent a tripping hazard.

As the furniture and bed height are often not uniform, it is desirable for the staircase to be easily reconfigured to adapt to various vertical elevations. It may also be desirable for the central support element of a spiral staircase to be vertically adaptable. Due to space limitations, the shape of the spiral need may be different. It may also be desirable for the direction of the spiral to be changed. Further, it is desirable for a staircase to be self-supporting and not rely on a fixed structure for support.

Pet safety presents another concern. A gap or space between steps could present a problem to a small animal. The animal may get one of its legs caught in the space between the steps. Additionally, a pet could be confused with an open spiral staircase, and not traverse the spiral. Accordingly, it may be desirable to enclose the outer circumference of the staircase and space between steps.

Pet steps and ramps are often made of hard plastic, pressed cover board, fabric, and carpet covered surfaces. This construction does not satisfy pet owners' needs for safety and aesthetics. Fabric and carpet are difficult to remove, and are often the host of fleas and bacteria, which accumulate over time. Additionally, the overall look may clash with the décor of the home. Therefore, it may desirable for a staircase to provide a clean and easily maintainable surface, and present an aesthetically pleasing design.

Pet spiral staircases are desirable in areas and situations with limited space or where other objects in a room present a logistical challenge. Some examples may include: small bedrooms, studio apartments; areas where other furniture are present; and door openings. Attempts have been made to provide a spiral staircase capable of space saving. See for example: U.S. Pat. Nos. 1,774,582, 3,513,547, 5,515,657, 6,523,310, 7,377,080. However, each of these references suffer from a number of disadvantages, including: the lack of ability to be self-supporting; the requirement of a large amount of floor space to traverse the vertical distance; the lack of an ability to reconfigure the vertical distance; the lack of removable inserts; the lack of special adaptability; permanent attachment to a fixed structure; the lack of ability of ease of assembly and storage; the lack of special adaptability of individual components; and inclusion of designs incorporating open railings and stair members. Therefore, there exists a need for a device that is self-supporting; reversible; space-saving; compactable for storage; safe for pet elevation; easily assembled; reconfigurable; and environmentally safe in assisting pets to traverse vertical elevations.

SUMMARY

The present invention is directed to an apparatus that satisfies the need for a device that is self-supporting; reversible; space-saving; compactable for storage; safe for pet elevation; easily assembled; reconfigurable; and environmentally safe in assisting pets to traverse vertical elevations. The device comprises: a bottom tread storage platform member; a plurality of tread platform members, elevated above the bottom storage platform member; a center leg support member, and a plurality of outer leg support members, which support the tread platform members; and a helical skirt board railing member that supports the tread platform members and traverses the perimeter of the apparatus.

It is an object of the current invention to provide a self-supporting and space-efficient reversible pet spiral staircase, which safely allows pets to travel vertical elevations.

It is another object of the current invention to provide a self-supporting, reversible pet spiral staircase, which is capable of being easily reconfigured to adapt to differing space and elevation configurations.

It is another object of the current invention to provide a self-supporting, reversible pet spiral staircase, which is capable of easy assembly for storage.

It is another object of the current invention to provide a self-supporting, reversible pet spiral staircase, in which the vertical height of the central support member can be easily changed.

It is another object of the current invention to provide a self-supporting, reversible pet spiral staircase, which allows a clean and easily maintainable surface, which present an aesthetically pleasing design.

DESCRIPTION OF THE DRAWINGS

These and other features, aspects and advantages of the present invention will become better understood with regard to the following description, appended claims, and accompanying drawings where:

FIG. 3F shows an individual riser and riser tab, in accordance with an embodiment of the invention of FIG. 2;

DESCRIPTION

Overview

Figure 1:
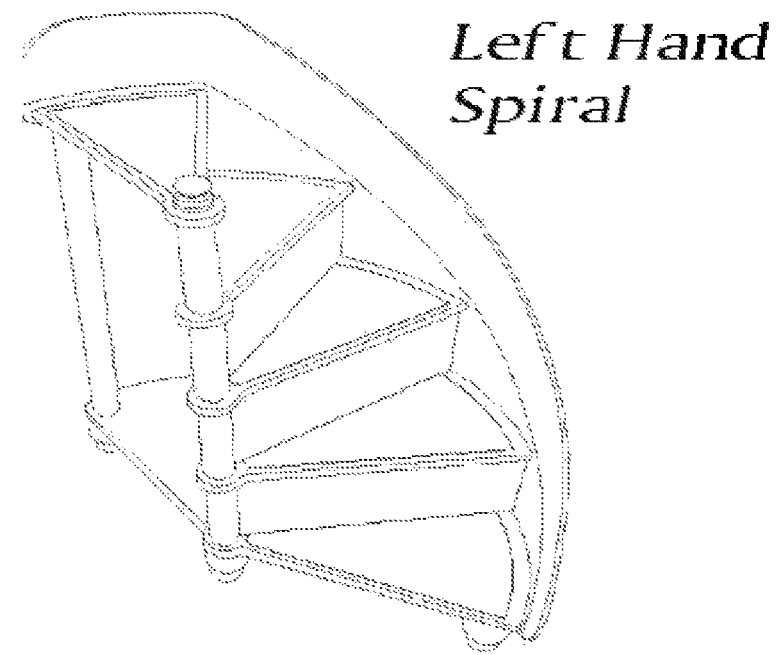
FIG. 1 shows a perspective view of embodiments of the current invention in the left-hand spiral configuration and right-hand spiral configuration.
Figure 1:
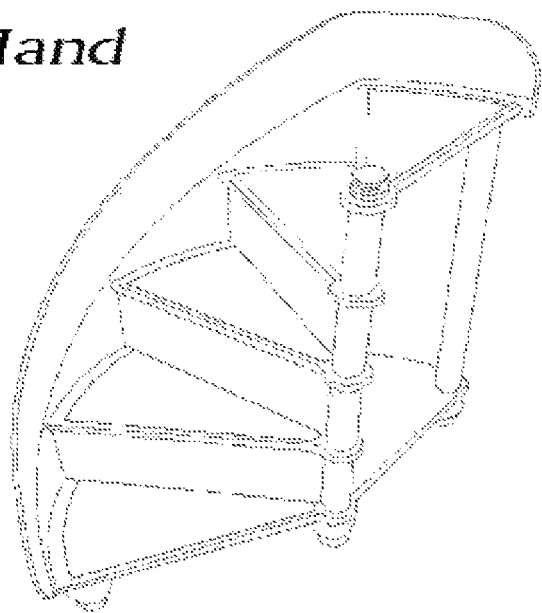

As illustrated in the accompanying drawings, a reversible pet spiral staircase according to embodiments of the current invention comprises: a bottom tread storage platform member 110; a plurality of tread platform members 140, elevated above the bottom tread storage platform member 110; a center leg support member 120, and a plurality of outer leg support members 130, 200, which support the tread platform members, 140; and a helical skirt board railing member 180, that supports the tread platform members 140. The device may have a plurality of foot support members 100, located below the bottom tread storage platform member 110.

Detailed Description of the Elements

As may be appreciated by the drawings, and in accordance with embodiments of the current invention, the bottom tread storage platform member 110, provides a base of stability for the entire device. The bottom tread storage platform member is flat and planar, of definite shape, and made of solid resilient material, and may contain decorative features.

The bottom tread storage platform member includes a number of through holes 105, for attachment of the center leg support member 120, and outer leg support members 130, 200. The bottom tread storage platform member 110, may contain a number of recess members 101. Recess members are concave recessed portions located on the surface of the bottom tread storage platform member 110, or tread platform members 140. The purpose of the recess members 101, is to allow a chosen surface such as carpet, tile, or decorative wood to be inserted into the recess members without the chosen surface slipping when being stepped on. As shown in FIG. 3C, optional carpet tile members 170, are inserted into the recess members. The carpet tile members are flat pieces of decorative carpet, and approximately the same dimensions as the recess members.

The center leg support member 120, and outer leg support members 130, 200, extend longitudinally perpendicular from the bottom tread storage platform member 110, and provide support for the tread platform members 140. The center leg support member 120, and outer leg support members 130, 200 are made of a solid, resilient material, and may contain decorative features.

Figure 2:
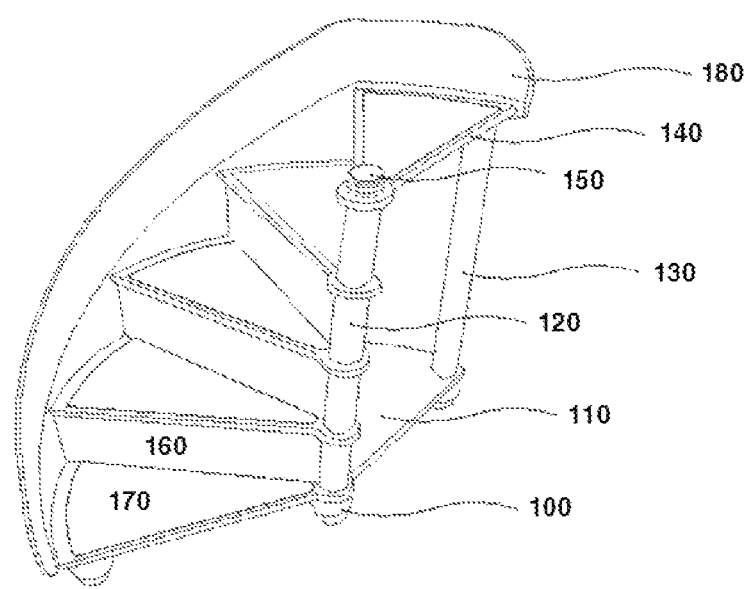
FIG. 2 shows an embodiment of the invention in the right-hand spiral configuration.

The tread platform members 140, serve as the horizontal stepping surface of the device. The tread platform members are flat and planar, of definite shape, and made of solid resilient material. The tread platform members are arranged so that they are vertically parallel in relation to the bottom tread storage platform member 110. As shown in FIG. 2, FIG. 3B, and FIG. 3C, each tread platform member is staggered both vertically and horizontally in relation to the bottom tread storage platform member such that the path ascending the individual tread platform members is upwardly helical, with the center leg support member 120, being the central axis point of the spiral.

Figure 3A:
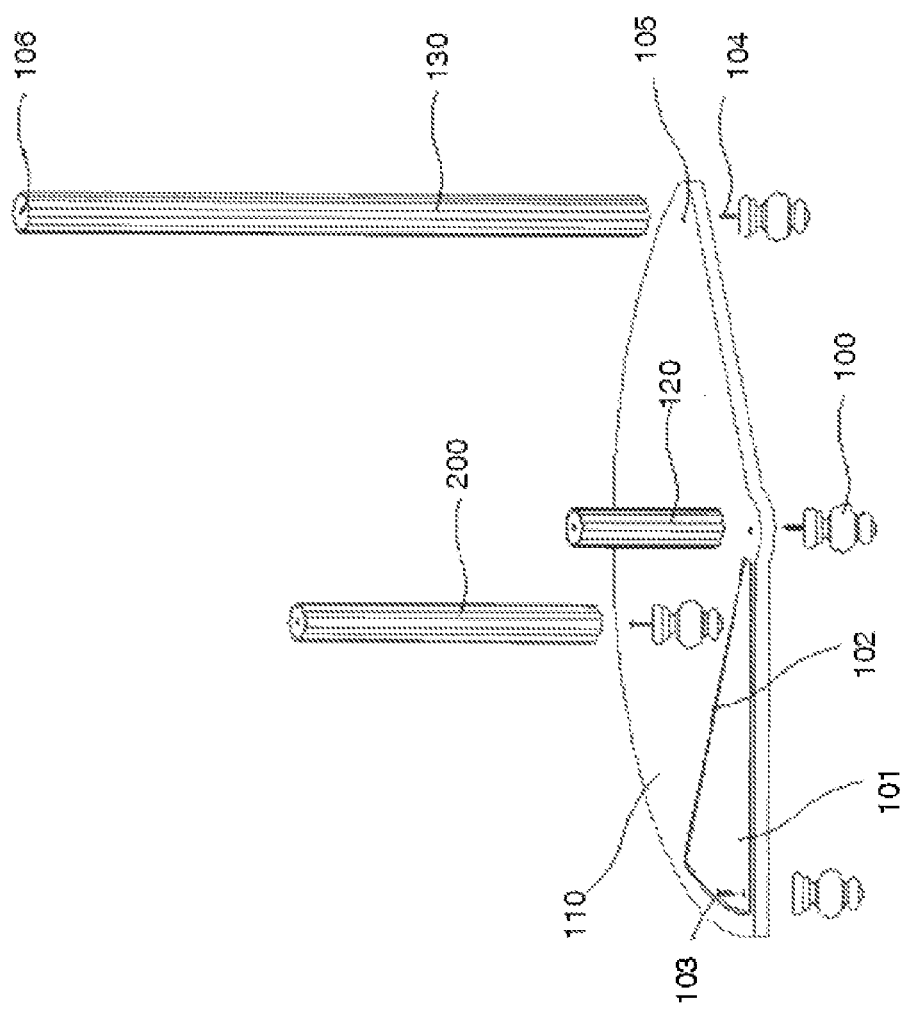
FIG. 3A schematically shows the assembly of the foot support members, bottom tread storage platform member, and tread platform members of an embodiment of the invention of FIG. 2.
Figure 3B:
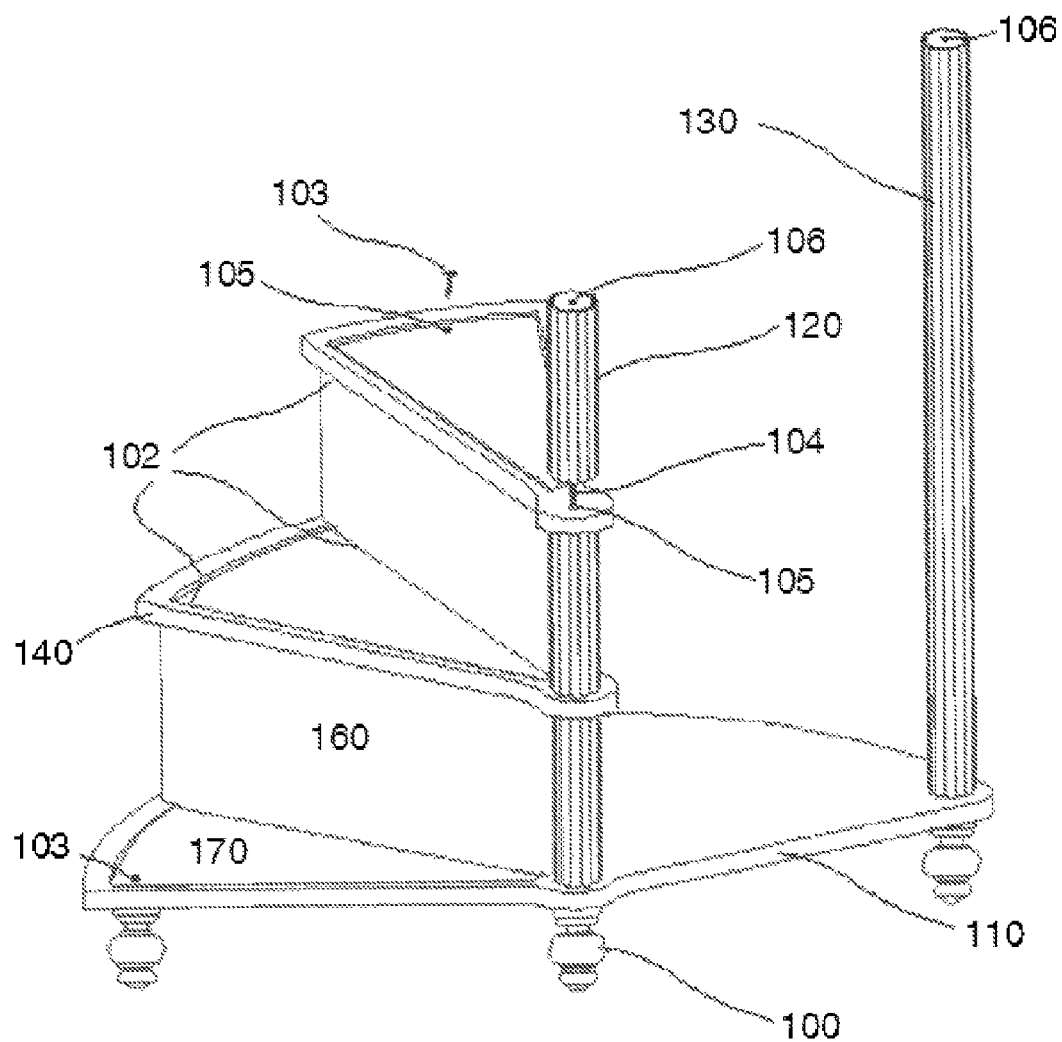
FIG. 3B schematically shows the assembly of the risers, tread platform members, center leg support member, and outer leg support members of an embodiment of the invention of FIG. 2.
Figure 3C:
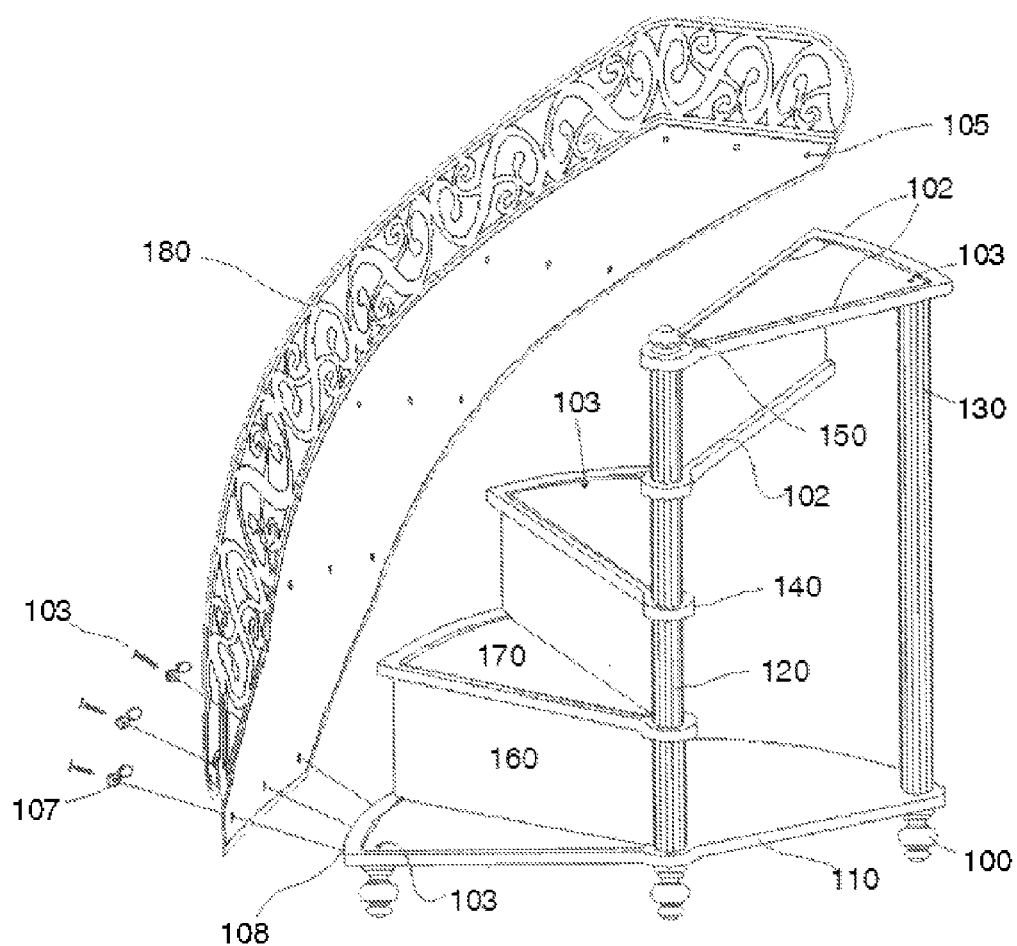
FIG. 3C schematically shows further assembly of the risers, tread platform members, center leg support member, outer leg support members, and skirt board railing member of an embodiment of the invention of FIG. 2.
Figure 3D:
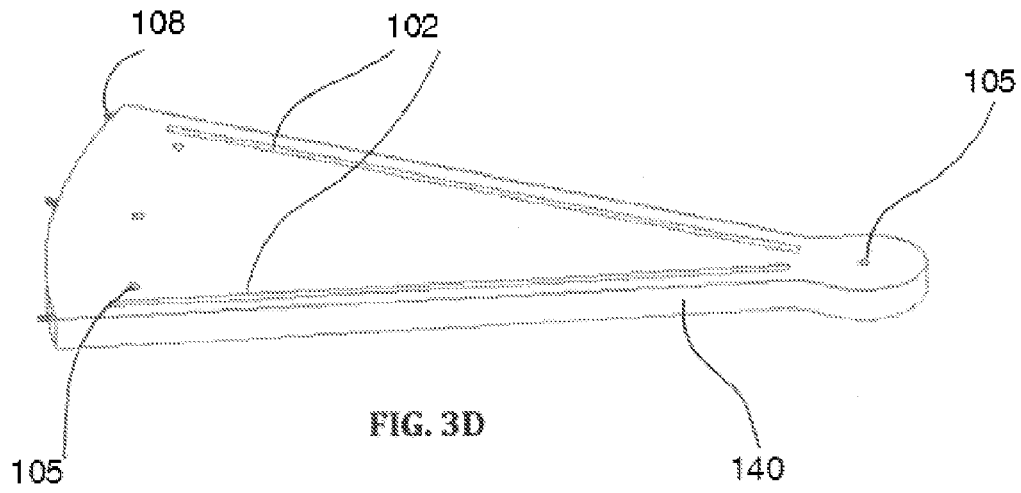
FIG. 3D shows the lower surface of the tread platform members in accordance with an embodiment of the invention of FIG. 2.
Figure 3E:
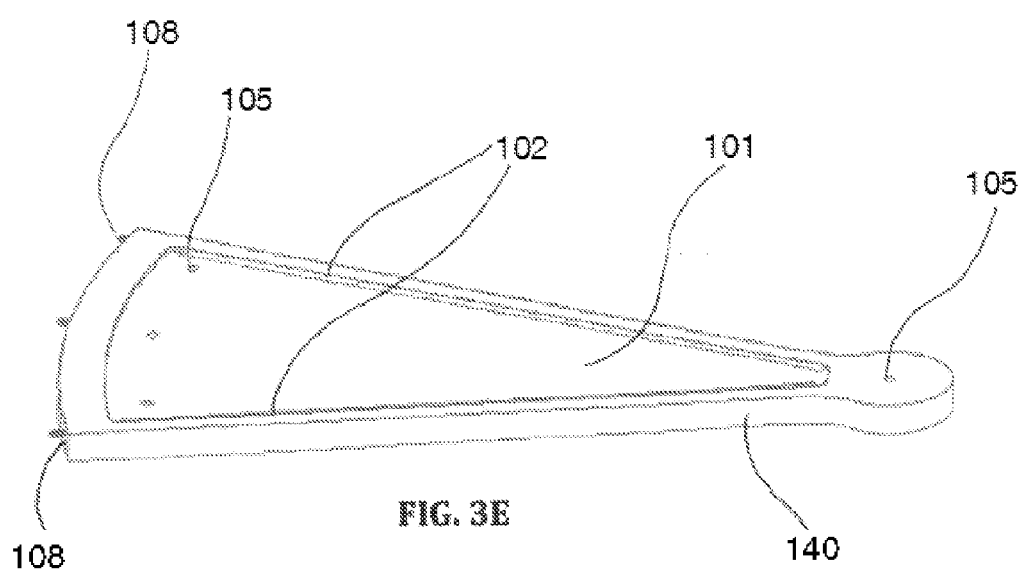
FIG. 3E shows the upper surface of the tread platform members in accordance with an embodiment of the invention of FIG. 2.
Figure 3G:
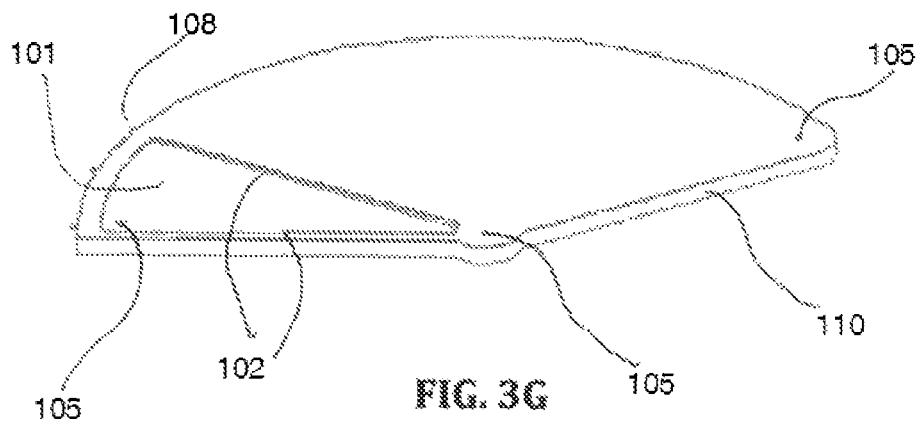
FIG. 3G shows the bottom tread storage platform member, recess members, and dado slots in the right-hand spiral configuration in accordance with embodiments of the present invention.

As illustrated in FIG. 1, FIG. 2, and FIG. 3G, the arrangement of the tread platform members 140, in relation to the bottom tread storage platform member 110, may be configured in either the left-hand spiral configuration or the right-hand spiral configuration. In the left-hand-spiral-configuration, the directional path of ascension is upwardly helical, and rotating left. Conversely, the directional path of ascension in the right-hand configuration is upwardly helical, and rotating right.

Each tread platform member 140, has an upper surface and a lower surface. As shown in FIG. 3D, the lower surface of each tread platform member includes a number of dado slots 102. Dado slots are recessed portions of the tread platform members 140, and the bottom tread storage platform member 110. The dado slots are recessed such that each dado slot will receive an individual riser 160. The upper surface of each tread platform member 140, includes a recess member 101. The upper surface of each tread platform member 140, also includes a number of dado slots 102.

The tread platform members 140, are supported by a number of risers 160. Risers are flat and planar, and made of resilient material. Risers are configured such that they provide vertical support for the tread platform members 140. The risers are arranged such that they are perpendicular to both the bottom tread storage platform member 110, and the tread platform members 140. As shown in FIG. 3B, each riser is inserted into dado slots 102, in such a configuration as to allow each tread platform member 140, to be supported by a corresponding riser 160. Each riser will be staggered vertically and horizontally, similar to that of its corresponding tread platform member 140. As illustrated in FIG. 3F, risers 160, may include riser tabs 161. Riser tabs are portions of the riser surface which have been augmented to fit into the dado slots. The purpose of the riser tabs 161, is to allow the risers to be inserted into the dado slots 102 to allow a snug, perfect fit.

The foot support members 100, may be located under the bottom tread storage platform member 110. The foot support members extend longitudinally perpendicular in relation to the bottom tread storage platform member 110. The foot support members 100, extend in the opposite direction of the center leg support member 120, and outer leg support members 130, 200. The purpose of the foot support members is to raise the bottom tread storage platform member from the ground surface in a manner that provides balance and stability. The foot support members are made of solid, resilient material, and may contain decorative features.

The skirt board railing member 180, traverses the perimeter of the spiral and provides support for the tread platform members 140. The skirt board railing member is constructed of bendable and pliable solid material, and is of definite shape. As shown in FIG. 3C, the skirt board railing member is attached at various points to the edges of the tread platform members 140, in such a manner that the skirt board railing member 180, spirals in an upwardly helical configuration, and is perpendicular to the upper surface of the tread platform members 140. The skirt board railing member may contain decorative features.

How the Invention is Used

The previously described version of the present invention has many advantages including a safe efficient, and easily storable design. The device can be assembled in either the left-hand spiral configuration or the right-hand spiral configuration. The device is versatile and maximizes available space in a room by conforming to the shape and arrangement of existing furniture. The device may also be configured in a number of different heights by changing the number of components. When storage is necessary, the device can be disassembled with ease.

The device also provides a biologically safe environment. Certain pet steps and ramps are often covered with fabrics or carpet. With time, these surfaces begin to collect fleas and bacteria. The current invention allows for easy placement and removal of an aesthetic piece such as carpet tile to be inserted. Pet owners may choose the surface to match their individual tastes and room décor.

Specific Embodiments and Examples

An example of an embodiment of the current invention is described in FIG. 1 and is further described as the preferred design and best mode for carrying out the invention. The bottom tread storage platform member 110, is constructed of maple wood, is substantially flat and planar, and is shaped as a circular sector, as shown in FIG. 3G. The bottom tread storage platform member contains four through holes 105. One through hole is placed near the center of the circular sector. The remaining three holes are spaced evenly, and placed near the perimeter of the circular sector arc, as shown in FIG. 3G. The circular sector is further divided into four geometric circular sector quadrants, each having the same radius as the circular sector, with a central angle that is approximately one-fourth (¼) that of the larger circular sector.

FIG. 3G illustrates the right-hand spiral configuration. The recess members 101, are shaped approximately the same as the four circular sector quadrants. In the right-hand spiral configuration, an individual recess member 101, is located near the left side of the circular sector, as shown in FIG. 3G. Dado slots 102, are further recessed into the individual recess members. The dado slots are linear slots, located near the perimeter of the recess members, and parallel with the radius of the circular sector quadrant.

As illustrated in FIG. 3A and FIG. 3B, the center leg support member 120, is an elongated cylinder attached to the upper surface of the bottom tread storage platform member 110. The center leg support member is attached to the bottom tread storage platform member 110, by inserting threaded screw type 104, through a through hole 105, in the bottom tread storage platform member 110, and into a through hole 106, in the center leg support member. As illustrated in FIG. 3B, the center leg support member 120, is divided into four segments. Each segment is the approximate height of each of the risers 160. Each segment has an additional through hole in the upper portion, as shown in FIG. 3B. The center leg storage member is made of maple wood and is etched in a decorative manner.

As illustrated in FIG. 3A and FIG. 3B, an outer leg support member 130, and another outer leg support member 200, are attached to the upper surface of the bottom tread storage platform member 110. Each of the outer leg support members is an elongated cylinder with through holes 106, in the upper and lower portions. The height of one outer leg support member 130, is approximately twice the height of an individual riser 160. The height of the remaining outer leg support member 200, is approximately four times the height of an individual riser 160. Each outer leg support member is attached to the bottom tread storage platform member 110, by inserting threaded screw type 104, into respective through holes 105, in the bottom tread storage platform member 110, and into the through holes 106, in each outer leg support member.

As illustrated in FIG. 3B, this embodiment contains four tread platform members 140, and four risers 160. Each tread platform member is flat, and shaped similar to the circular sector quadrants. As illustrated in FIG. 3D, each of the tread platform members 140, contain four through holes 105. One of the through holes 105, located near the center of the circular sector quadrant, and the remaining three through holes 105, are located along the perimeter of the "circular sector quadrant arc", as shown in FIG. 3D and FIG. 3E. As shown in FIG. 3E, the lower surface of each tread platform member 140, contains two dado slots 102, located near the perimeter and parallel to the radius of the circular sector quadrant. The upper surface of each tread platform member 140 further contains a recess member, 101. Each of the recess members are of similar shape to, but slightly smaller than its corresponding tread platform member 140. Dado slots 102, are further recessed into the individual recess member. The dado slots are linear slots, located near the perimeter of the recess members, and parallel with the radius of the circular sector quadrant. The tread platform members are made of maple wood.

The risers 160, are flat, and shaped like a simple concave polygon, as illustrated in FIG. 3F. To render the shape of the riser, a flat piece of oil tempered hardboard is cut into the shape of a rectangle. The length of each respective rectangle is approximately the length of an individual tread platform member, 140. Four slots are cut near the corners of the rectangle to create an extended surface, as illustrated in FIG. 3F. The length of the extended surface is approximately the length of an individual dado slot, 102. The width of each riser is approximately the width of an individual dado slot. The extended surface serves as a riser tab 161.

Construction of the device is illustrated in FIG. 3B. A riser 160, is inserted into a dado slot 102, located on the upper surface of the bottom tread storage platform member 110. One of the four center leg support member segments 120, is attached to the bottom tread storage platform member 110. The outer leg support members 130, 140, are attached to the bottom tread storage platform member. The upper portion of the riser is inserted into a dado slot on the lower surface of an individual tread platform member 140. An additional center leg support member segment 120, is attached to the upper surface of the tread platform member, 140. Another riser 160, is inserted in the dado slot 102, in the upper surface of the tread platform member 140. The riser is inserted into a dado slot located on the bottom surface of an additional tread platform member 140. The additional tread platform is attached to the top of the center leg support member segment 120. Additionally, the tread platform member 140, is attached to the center leg support member 200, by passing a threaded fastener 103, into a through hole 105, on the upper surface of the tread platform member 140, and into the through hole 106, in the top of the center leg support member 106.

The process of adding additional risers 160, tread platform members 140, and center leg support member segments 120, is repeated until the remaining two risers and tread platform members are securely attached. The last remaining tread platform member 140, is attached to the outer leg support member 130, by passing a threaded fastener 103, into a through hole 105, on the upper surface of the tread platform member 140, and into the through hole 106, in the top of the outer leg support member 106, 130.

The skirt board railing member 180, is a flat piece of oil tempered hardboard, approximately one-fourth of an inch (¼") thick. The skirt board railing member is shaped similar to a helical quadrilateral, as shown in FIG. 3C. The width of the skirt board railing member 180, is slightly larger than the arc length of one of the tread platform members 140. The skirt board railing member is designed to be pliable and able to conform to the spiral shape of the device. The skirt board railing member contains decorative etching, as illustrated in FIG. 3C.

The bottom tread storage platform member 110, and each of the tread platform members 140, may be connected to the skirt board railing member 180, using a threaded fastener 103, and threaded fastener cover 107, as shown in FIG. 3C. The threaded fastener 103, can be a standard screw type with a head or headless, which receives a nut. The threaded fastener cover 107, may be any of the following: a standard washer type with a hole in center and hinged snap cover; a press on cover; or a threaded cover. Although FIG. 3C shows an embodiment with the bottom tread storage platform member 110, and tread platform members 140, being attached to the skirt board railing member 180, with a threaded fastener 103, and threaded fastener cover 107, any latching mechanism is within the scope of this invention.

The bottom tread storage platform member 110, and each of the tread platform members 140, may be connected to the center leg support member 120, and outer leg support members 130, and 200, by inserting threaded screw type 104, into respective through holes, 105, 106, as illustrated in FIG. 3A and FIG. 3B. Although FIG. 3A and FIG. 3B shows an embodiment using a threaded fastener 104, any latching mechanism that is capable of securing the center leg support member 120, and outer leg support members 130, 200, to the upper surface of the bottom tread storage platform member 110, tread platform members 140, is within the scope of this invention.

Four foot support members 100, are attached to the lower surface of the bottom tread storage platform member 110, as shown in FIG. 3A. The foot support members are solid, roughly cylindrical, and elevate the bottom tread storage platform member 110, from the surface of the ground. The foot support members are constructed of maple wood, and contain decorative features, as illustrated in FIG. 3C. The foot support members are attached to the bottom tread storage platform member by inserting a threaded screw type 104, into respective through holes 105, as illustrated in FIG. 3A and FIG. 3B. Although FIG. 3A and FIG. 3B shows an embodiment using a threaded fastener 104, any latching mechanism that is capable of securing the foot support members 100, to the lower surface of the bottom tread storage platform member 110, is within the scope of this invention.

A finial member 150, is attached to the upper surface of a tread platform member 140, as shown in FIG. 3C. The finial member is solid, cylindrical in shape, constructed of maple wood, and contains decorative features. The finial member is attached to the upper surface of a tread platform member by inserting a threaded screw type 104, into respective through holes 105, as illustrated in FIG. 3A and FIG. 3B. Although FIG. 3A and FIG. 3B shows an embodiment using a threaded fastener 104, any latching mechanism that is capable of securing the finial member 150, to upper surface of a tread platform member 140, is within the scope of this invention.

Alternatives

Figure 4A:
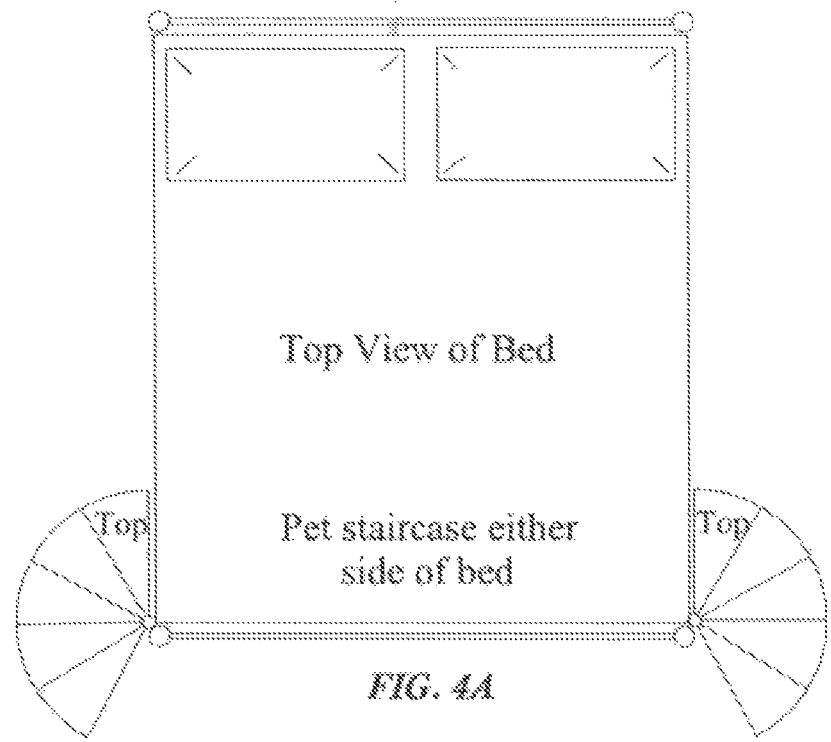
FIG. 4A shows the possible positioning of an embodiment the device at the side of a bed in accordance with embodiments of the present invention.
Figure 4B:
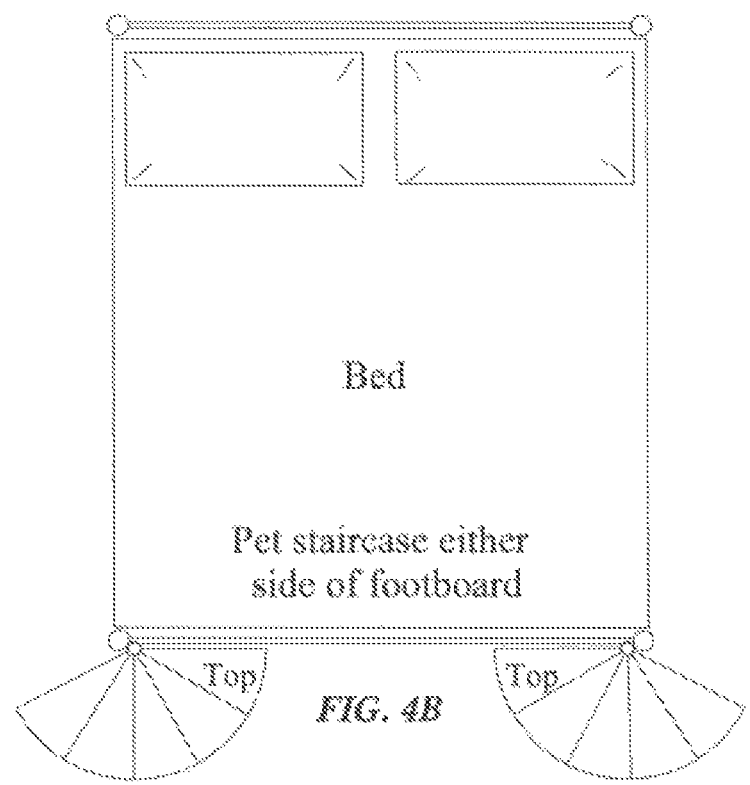
FIG. 4B shows the possible positioning of the device at the footboard of a bed in accordance with embodiments of the present invention.
Figure 5:
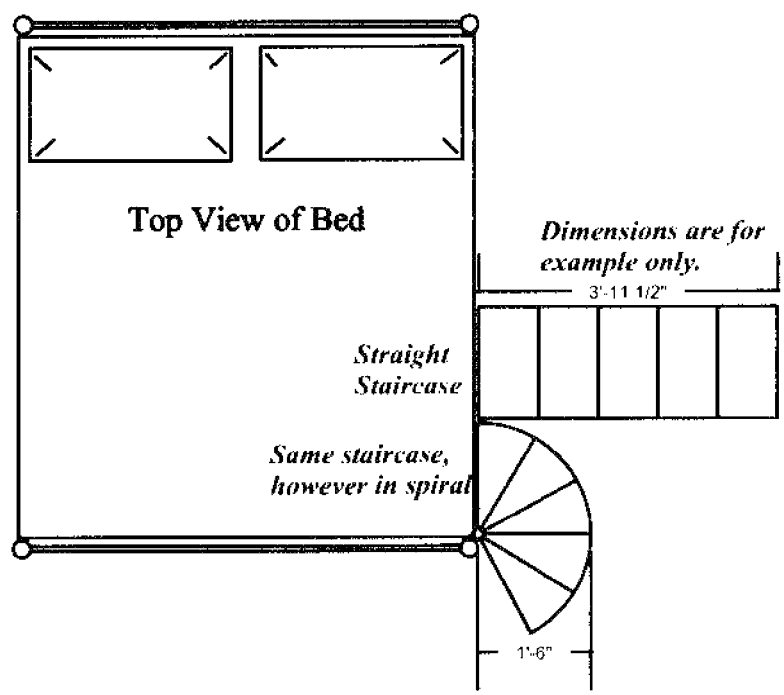
FIG. 5 shows a top view of the possible positioning of the device at the footboard of a bed, and illustrates the space saved in comparison with a straight pet staircase in accordance with embodiments of the present invention.
Figure 6:
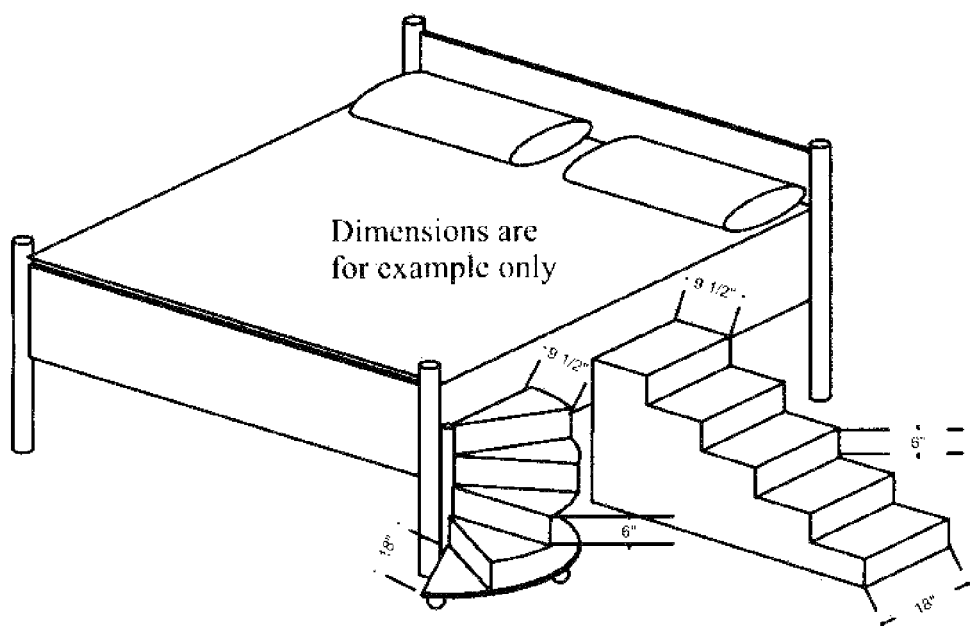
FIG. 6 shows an isometric view of the possible positioning of the device at the footboard of a bed, and illustrates the space saved in comparison with a straight pet staircase in accordance with embodiments of the present invention.

Although the present invention has been described in considerable detail with reference to certain preferred versions thereof, other versions are possible. For example, FIGS. 4A and 4B show an embodiment with four risers and four tread platform members. However, an apparatus according to the present invention may include more or less risers and tread platform members. Additionally, an embodiment of the present invention may include a different number of outer leg support members and foot support members. The vertical height of the individual risers, center leg support members, and outer leg support members may also be increased or decreased. One embodiment may also not include the risers, such that the entire device has an open staircase look.

Figure 3H:
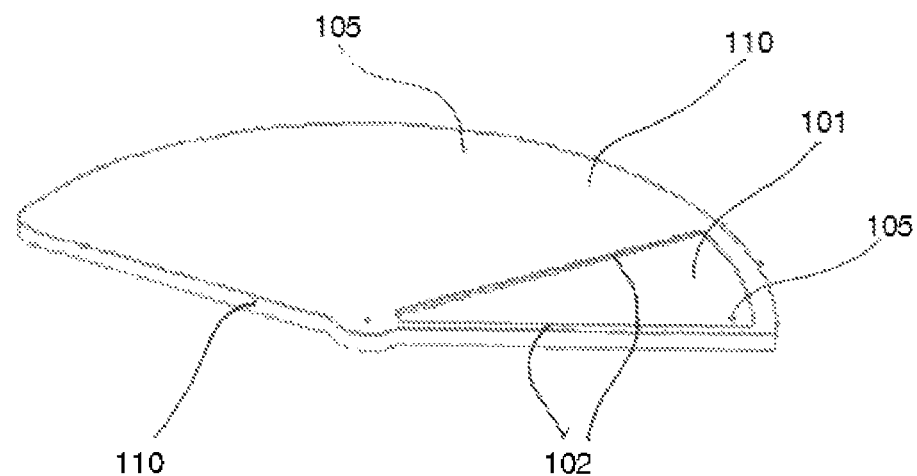
FIG. 3H shows the bottom tread storage platform member, recess members, and dado slots in the left-hand-spiral configuration in accordance with embodiments of the current invention.

As previously stated, the device can be configured in either the left-hand spiral configuration or the right-hand spiral configuration. The configuration is changed by the placement and directional relationship between the individual elements. As illustrated in FIG. 3G and FIG. 3H, the placement of the recess member in the bottom tread platform member may determine the configuration. One embodiment contemplated by the present invention is to have a recess member on the upper and lower surface of the bottom tread platform member. Therefore, the configuration of the device could be changed by turning the bottom tread storage member upside down and attaching the corresponding elements.

Figure 7:
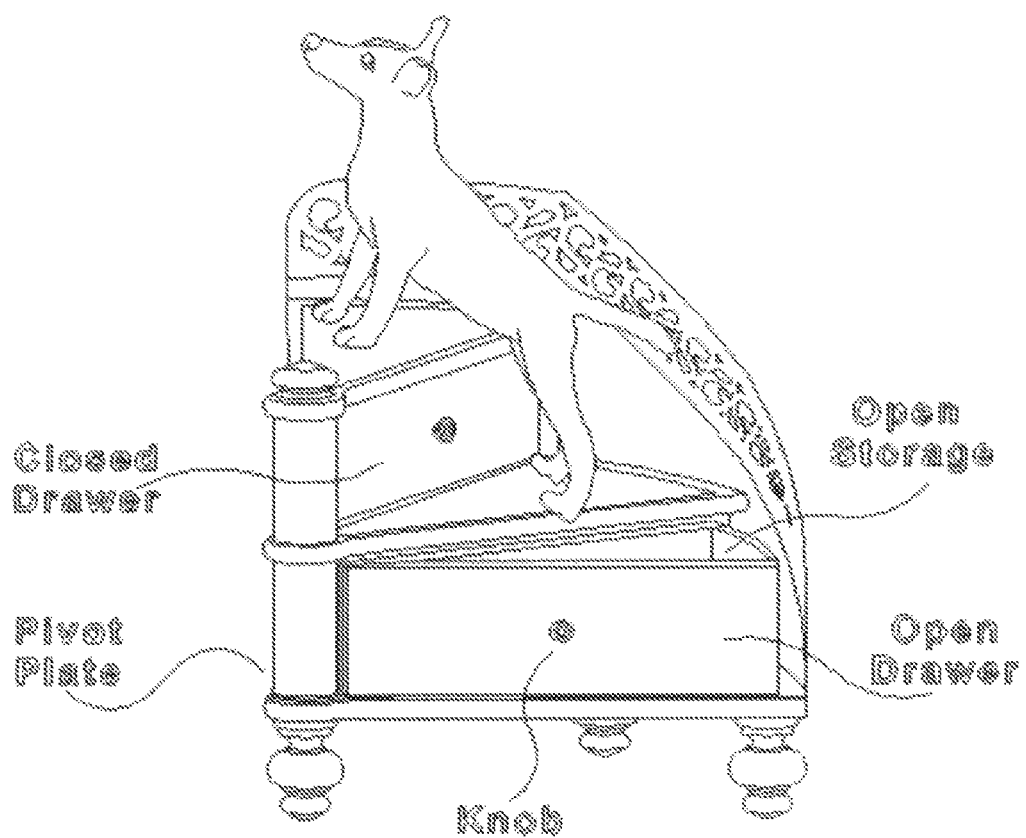
FIG. 7 shows a front perspective view of a pet traversing the steps of an embodiment of the current invention.

Another embodiment of the current invention contemplated is to include storage compartments. The storage compartments may be located behind the risers or below the tread platform members. An embodiment contemplated is the use of a removable or hinged lid under the carpet, or a pull-out drawer type, where the riser is located. The pull out drawer may pivot on the center leg support element, as illustrated in FIG. 7.

Although a carpet tile member is mentioned, other aesthetic material may be inserted into the recess members. Plush decorative pillows are also an alternative to a carpet tile member as well as tile and wood. Although FIG. 4A and FIG. 4B show an embodiment of current invention used with a bed, the apparatus according to the current invention can be configured for other furniture or locations. Therefore, the spirit and scope of the appended claims should not be limited to the descriptions of the preferred versions herein.

Any element in a claim that does not explicitly state "means for" performing a specified function, or "step for" performing a specific function, is not to be interpreted as a "means" or "step" clause as specified in 35 U.S.C. §112, ¶ 6. In particular, the use of "step of" in the claims herein is not intended to invoke the provisions of 35 U.S.C. §112, ¶ 6.

What is claimed is:

1. A reversible pet spiral staircase, comprising:
   a. a self-supporting reversible bottom tread storage platform member having an upper surface and a lower surface, wherein said self-supporting reversible bottom tread storage platform member is non-fixedly attached to a structure and capable of independent support;
   b. a center leg support member, which may be vertically reconfigured by assembling said center leg support member from a plurality of center leg support member segments, thereby allowing the height of said reversible pet spiral staircase from the ground to the top of said reversible pet spiral staircase to be adjustable;
   c. a plurality of tread platform members, elevated above said self-supporting reversible bottom storage platform member, which are positioned in an upwardly helical path relative to said center leg support member;
   d. a plurality of outer leg support members, which provide support to said tread platform members;
   e. a helical skirt board railing member that supports said tread platform members and traverses the perimeter of said reversible pet spiral staircase;
   f. a first recess member located on said upper surface of said self-supporting reversible bottom tread storage platform member, and a second recess member located on said lower surface of said self-supporting reversible bottom tread storage platform member directly underneath said first recess member, such that turning over said self-supporting reversible bottom tread storage platform member allows said reversible pet spiral staircase to be assembled in either a left-hand spiral configuration or a right-hand spiral configuration; and
   g. a first traction member removably inserted into the upward facing first or second recess member of the self-supporting reversible bottom tread storage platform defining the first step of the reversible pet spiral staircase.

2. The reversible pet spiral staircase of claim 1, wherein said self-supporting reversible bottom tread storage platform member is flat and planar, of definite shape, and made of solid resilient material.

3. The reversible pet spiral staircase of claim 2, wherein said self-supporting reversible bottom tread storage platform member contains a plurality of recess members.

4. The reversible pet spiral staircase of claim 2, wherein said self-supporting reversible bottom tread storage platform member contains a plurality of holes for attachment of said center leg support member, and outer leg support members.

5. The reversible pet spiral staircase of claim 3, wherein said recess members are located on the upper and lower surface of said self-supporting reversible bottom tread storage platform member.

6. The reversible pet spiral staircase of claim 1, wherein said center leg support member extends longitudinally perpendicular from the bottom of said self-supporting reversible bottom tread storage platform member.

7. The reversible pet spiral staircase of claim 1, wherein each of said central support member segments is the approximate height of the vertical displacement between each of said tread platform members.

8. The reversible pet spiral staircase of claim 1, wherein each of said central support member segments are attached perpendicular to the respective upper and lower surface of said tread platform members.

9. The reversible pet spiral staircase of claim 1, wherein said tread platform members are flat and planar, of definite shape, and made of solid resilient material.

10. The reversible pet spiral staircase of claim 1, wherein each of said tread platform members is staggered both vertically and horizontally in relation to said self-supporting reversible bottom tread storage platform member such that the path ascending the individual tread platform members is upwardly helical, with said center leg support member being the central axis point of the spiral.

11. The reversible pet spiral staircase of claim 1, wherein said outer leg support members are attached perpendicular to the bottom surface of said tread platform members.

12. The reversible pet spiral staircase of claim 1, wherein said skirt board railing member is constructed of bendable and pliable solid material, and is of definite shape.

13. The reversible pet spiral staircase of claim 1, wherein said skirt board railing member traverses the perimeter of the spiral and provides support for said tread platform members.

14. The reversible pet spiral staircase of claim 1, wherein said skirt board railing member is attached at various points to the edges of said tread platform members, in such a manner that said skirt board railing member spirals in an upwardly helical configuration, and is perpendicular to the upper surface of said tread platform members.

15. The reversible pet spiral staircase of claim 1, wherein said skirt board railing member contain decorative features.

16. The reversible pet spiral staircase of claim 1, further comprising a plurality of risers.

17. The reversible pet spiral staircase of claim 16, wherein said risers are flat and planar, and made of resilient material.

18. The reversible pet spiral staircase of claim 16, wherein said risers are arranged such that they are perpendicular to both said self-supporting reversible bottom tread storage platform member and said tread platform members.

19. The reversible pet spiral staircase of claim 16, wherein said risers further comprise a plurality of riser tabs, which are portions of said riser surface which have been augmented to fit into a plurality of dado slots, according to embodiments of the current invention.

20. The reversible pet spiral staircase of claim 1, further comprising a plurality of foot support members.

21. The reversible pet spiral staircase of claim 20, wherein said foot support members extend longitudinally perpendicular from the bottom surface of said self-supporting reversible bottom tread storage platform members.

22. The reversible pet spiral staircase of claim 1, which can be assembled in either a left-hand spiral configuration or a right-hand spiral configuration, according to embodiments of the current invention.

23. The reversible pet spiral staircase of claim 1, further comprising a plurality of pull-out drawers, wherein said pull-out drawers are slidably engaged to a bottom surface of the tread platform members, said pullout drawers pivoting about said center leg support elements between open and closed positions.

24. A reversible pet spiral staircase, comprising:
 a. a self-supporting reversible bottom tread storage platform member having an upper surface and a lower surface, wherein said self-supporting reversible bottom tread storage platform member is non-fixedly attached to a structure and capable of independent support;
 b. a center leg support member, which may be vertically reconfigured by a assembling said center leg support member of a plurality of center leg support member segments;
 c. a plurality of outer leg support members, which provide support to said tread platform members;
 d. a plurality of tread platform members, elevated above said self-supporting reversible bottom storage platform member, which are positioned in an upwardly helical path relative to said center leg support member, and whose upper and lower surfaces are attached perpendicular to said center leg support member segments and said outer leg support members;
 e. a helical skirt board railing member that supports said tread platform members and traverses the perimeter of said reversible pet spiral staircase;
 f. a first recess member located on said upper surface of said self-supporting reversible bottom tread storage platform member, and a second recess member located on said lower surface of said self-supporting reversible bottom tread storage platform member directly underneath said first recess member, such that turning over said self-supporting reversible bottom tread storage platform member allows said reversible pet spiral staircase to be assembled in either a left-hand spiral configuration or a right-hand spiral configuration;
 g. a plurality of recess members located on an upper surface of said tread platform members; and
 h. a first traction member removably inserted into the upward facing first or second recess member of the self-supporting reversible bottom tread storage platform defining the first step of the reversible pet spiral staircase.

25. A reversible pet spiral staircase, comprising:
 a. a self-supporting reversible bottom tread storage platform member;
 b. a center leg support member, which may be vertically reconfigured by a assembling said center leg support member of a plurality of center leg support member segments;
 c. a plurality of outer leg support members, which provide support to said tread platform members;
 d. a plurality of tread platform members, elevated above the bottom storage platform member, and which are positioned in an upwardly helical path relative to said center leg support member, and whose upper and lower surfaces are attached perpendicular to said center leg support member segments and said outer leg support members;
 e. a plurality of foot support members;
 f. further comprising a plurality of pull-out drawers, wherein said pullout drawers are slidably engaged to a bottom surface of the tread platform members, said pull-out drawers pivoting about said center leg support elements between open and closed positions;
 g. a helical skirt board railing member that supports said tread platform members and traverses the perimeter of said reversible pet spiral staircase
 h. a first recess member located on said upper surface of said self-supporting reversible bottom tread storage platform member, and a second recess member located on said lower surface of said self-supporting reversible bottom tread storage platform member directly underneath said first recess member, such that turning over said self-supporting reversible bottom tread storage platform member allows said reversible pet spiral staircase to be assembled in either a left-hand spiral configuration or a right-hand spiral configuration; and
 i. a first traction member removably inserted into the upward facing first or second recess member of the self-supporting reversible bottom tread storage platform defining the first step of the reversible pet spiral staircase.

* * * * *